(12) United States Patent
Lambert et al.

(10) Patent No.: US 9,280,857 B2
(45) Date of Patent: *Mar. 8, 2016

(54) DYNAMIC UPLOADING PROTOCOL

(71) Applicant: Lytx, Inc., San Diego, CA (US)

(72) Inventors: Daniel Lambert, Carlsbad, CA (US); Larry Richardson, San Diego, CA (US); Syrus C. Nemat-Nasser, San Diego, CA (US); Gabriela Surpi, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,948

(22) Filed: Jun. 30, 2015

(65) Prior Publication Data

US 2015/0310676 A1    Oct. 29, 2015

Related U.S. Application Data (63) Continuation of application No. 14/037,815, filed on Sep. 26, 2013, now Pat. No. 9,098,956.

(51) Int. Cl.
*G07C 5/08* (2006.01)
*G08G 1/16* (2006.01)
(Continued)

(52) U.S. Cl.
CPC *G07C 5/008* (2013.01); *G06F 7/00* (2013.01); *G06N 7/005* (2013.01); *G07C 5/085* (2013.01); *G08G 1/0112* (2013.01); *G08G 1/16* (2013.01); *G08G 1/162* (2013.01); *G08G 1/20* (2013.01); *H04L 67/10* (2013.01); *H04L 67/12* (2013.01); *G01C 21/3697* (2013.01); *G07C 5/0825* (2013.01); *G07C 5/0891* (2013.01); *G08G 1/164* (2013.01)

(58) Field of Classification Search
CPC ...... G07C 5/008; G07C 5/085; G07C 5/0825; G07C 5/0891; G08G 1/0112; G08G 1/16; G08G 1/162; G08G 1/164; G08G 1/20; G06F 7/00; G01C 21/3697; H04L 67/12; H04L 67/10; G06N 7/005
USPC .............. 701/1, 516, 517, 521; 709/217, 204; 348/148

See application file for complete search history.

(56) References Cited

U.S. PATENT DOCUMENTS 6,405,132 B1 * 6/2002 Breed .................... B60N 2/002
                                                701/117
6,556,905 B1 * 4/2003 Mittelsteadt ........... G07C 5/008
                                                340/439

(Continued)

*Primary Examiner* — Russell Frejd
(74) *Attorney, Agent, or Firm* — Van Pelt, Yi & James LLP (57) ABSTRACT

A dynamic uploading protocol comprises an input interface configured to receive a manifest comprising a plurality of events which may be uploaded; wherein the manifest additionally comprises sensor information relating to each of the plurality of events. The system for a dynamic uploading protocol additionally comprises a processor configured to determine whether to upload additional information about each event, wherein determining whether to upload additional information about each event is based at least in part on the sensor information and contextual information. The system for a dynamic uploading protocol additionally comprises an output interface configured to request the additional information. The system for a dynamic uploading protocol additionally comprises a memory coupled to the processor and configured to provide the processor with instructions.

21 Claims, 7 Drawing Sheets

(51) Int. Cl.
*G07C 5/00* (2006.01)
*G08G 1/01* (2006.01)
*G06F 7/00* (2006.01)
*G08G 1/00* (2006.01)
*G06N 7/00* (2006.01)
*H04L 29/08* (2006.01)
*G01C 21/36* (2006.01)

(56) References Cited

U.S. PATENT DOCUMENTS

| | | | | |
|---|---|---|---|---|
| 6,720,920 B2* | 4/2004 | Breed | ............... | B60N 2/2863 342/357.31 |
| 6,768,944 B2* | 7/2004 | Breed | ............... | B60W 40/06 213/36 |
| 7,085,637 B2* | 8/2006 | Breed | ............... | B60N 2/2863 340/440 |
| 2002/0105423 A1* | 8/2002 | Rast | ............... | G08G 1/162 340/479 |
| 2005/0065716 A1* | 3/2005 | Timko | ............... | G01S 19/16 701/29.3 |
| 2006/0058950 A1* | 3/2006 | Kato | ............... | B60R 11/04 701/409 |
| 2006/0095175 A1* | 5/2006 | deWaal | ............... | G07C 5/008 701/31.4 |
| 2006/0129283 A1* | 6/2006 | Alewine | ............... | G07C 5/008 701/1 |
| 2009/0096604 A1* | 4/2009 | Battista | ............... | G01S 5/0027 340/539.3 |
| 2010/0157061 A1* | 6/2010 | Katsman | ............... | G07C 5/0866 348/149 |
| 2010/0238009 A1* | 9/2010 | Cook | ............... | G06Q 10/10 340/439 |

* cited by examiner

DYNAMIC UPLOADING PROTOCOL

CROSS REFERENCE TO OTHER APPLICATIONS

This application is a continuation of U.S. patent application Ser. No. 14/037,815, issued as U.S. Pat. No. 9,098,956 entitled DYNAMIC UPLOADING PROTOCOL filed Sep. 26, 2013, which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. In some systems, sensor data is then transmitted to an external reviewing system. When it is impractical to transmit all sensor data to the external reviewing system (e.g., due to a high cost of data transmission or large data files), a subset of the data must be selected for transmission.

BRIEF DESCRIPTION OF THE DRAWINGS

Various embodiments of the invention are disclosed in the following detailed description and the accompanying drawings.

FIG. 6 is a flow diagram illustrating an embodiment of a process for determining events to request associated event data for.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dynamic uploading protocol is disclosed. A system for a dynamic uploading protocol comprises an input interface configured to receive a manifest comprising a plurality of events which may be uploaded; wherein the manifest additionally comprises sensor information relating to each of the plurality of events. The system for a dynamic uploading protocol additionally comprises a processor configured to determine whether to upload additional information about each event, wherein determining whether to upload additional information about each event is based at least in part on the sensor information and contextual information. The system for a dynamic uploading protocol additionally comprises an output interface configured to request the additional information. The system for a dynamic uploading protocol additionally comprises a memory coupled to the processor and configured to provide the processor with instructions.

A vehicle event recorder mounted on a vehicle records anomalous vehicle events. Anomalous vehicle event types include accidents, possible collisions, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. When anomalous vehicle events occur, sensors (video recorders, audio recorders, accelerometers, gyroscopes, vehicle state sensors, GPS, etc.) record anomalous vehicle event data associated with the event. The event is stored on the vehicle event recorder associated with the event data. Events are transmitted to a vehicle data server for review and long-term storage. Events can be transmitted to the vehicle data server by a low-cost, high-bandwidth connection (e.g., a wired connection) when the vehicle checks in at a home station. However, some events are high enough priority to warrant transmission to the vehicle data server quickly, and some vehicles only return to a home station on rare occasions. Event data can be transmitted wirelessly, but only at a cost, thus it is necessary to prioritize which events to transmit wirelessly and which events should remain on the vehicle event recorder until a low-cost, high bandwidth connection can be established.

As the vehicle event recorder records events, it builds an event manifest. The vehicle event recorder determines an event type for each event and stores it in the event manifest associated with an event identifier for the event. A subset of the associated event data is determined and also stored associated with the event identifier. The subset of the associated event data comprises the minimum set of associated event data required to determine the event importance. At an appropriate time (e.g., when 10 events have been recorded, every six hours, every 50 miles driven, etc.), the manifest is transmitted (e.g., wirelessly) to the vehicle data server. The vehicle data server analyzes the events in the manifest and determines which, if any, of them should be uploaded for further review. The vehicle data server then transmits a request to the vehicle event recorder for any events that should be uploaded, and the vehicle event recorder transmits the events, including all associated event data, to the vehicle data server.

Figure 1:
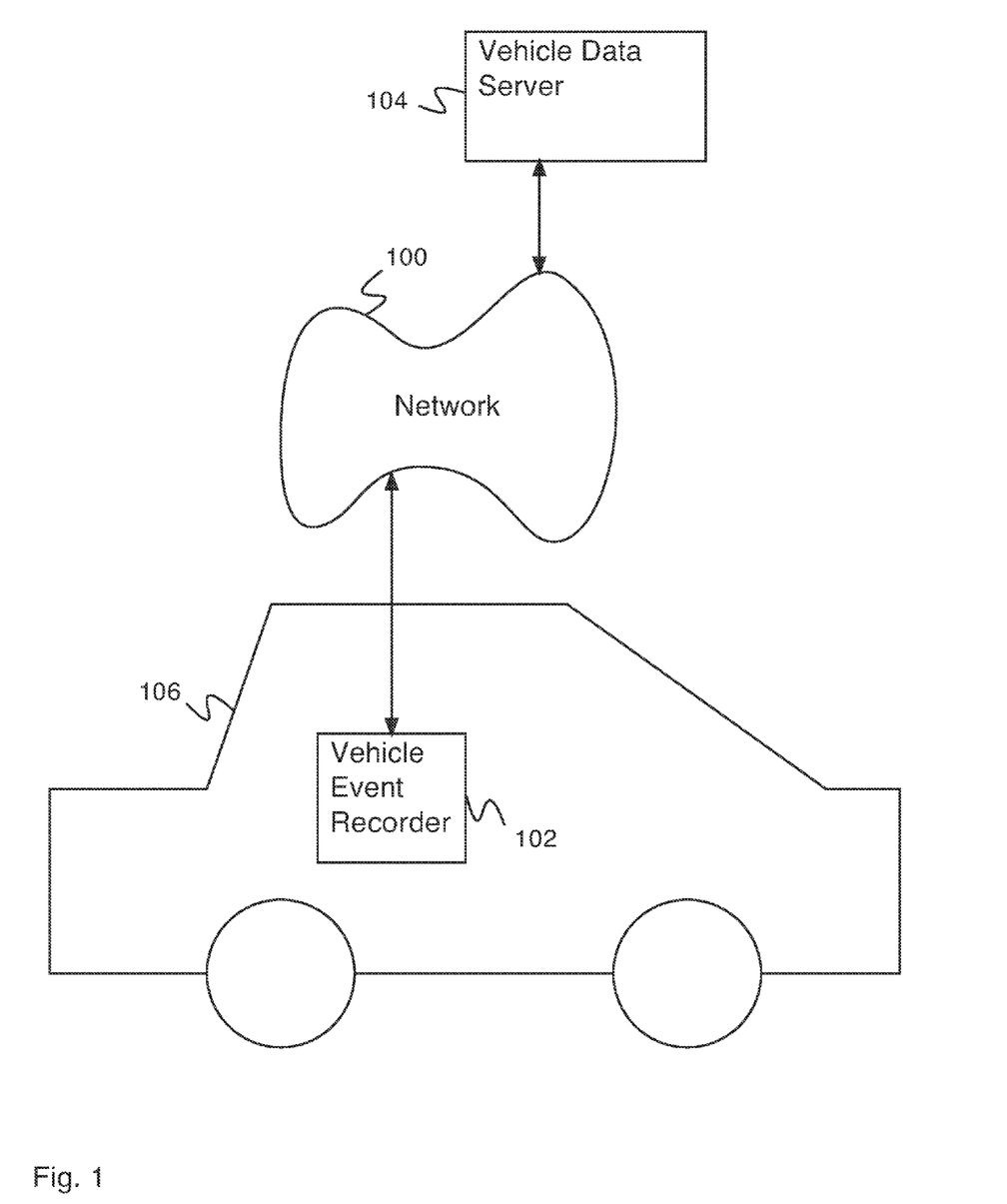
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, advanced driver assistance systems (e.g., image analysis data from lane tracking and departure warning system), audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events using a processor. In some embodiments, vehicle event recorder 102 comprises map data. In some embodiments, vehicle event recorder 102 comprises a system for detecting risky behavior. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, universal mobile telecommunications system (UMTS), long term evolution (LTE), worldwide interoperability for microwave access (WiMax), integrated digital enhanced network (iDEN), or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are uploaded to vehicle data server 104 when vehicle 106 arrives at the home station. In some embodiments, vehicle data server 104 is located at a remote location. In some embodiments, events recorded by vehicle event recorder 102 are uploaded to vehicle data server 104 wirelessly. In some embodiments, a subset of events recorded by vehicle event recorder 102 is uploaded to vehicle data server 104 wirelessly.

Figure 2:
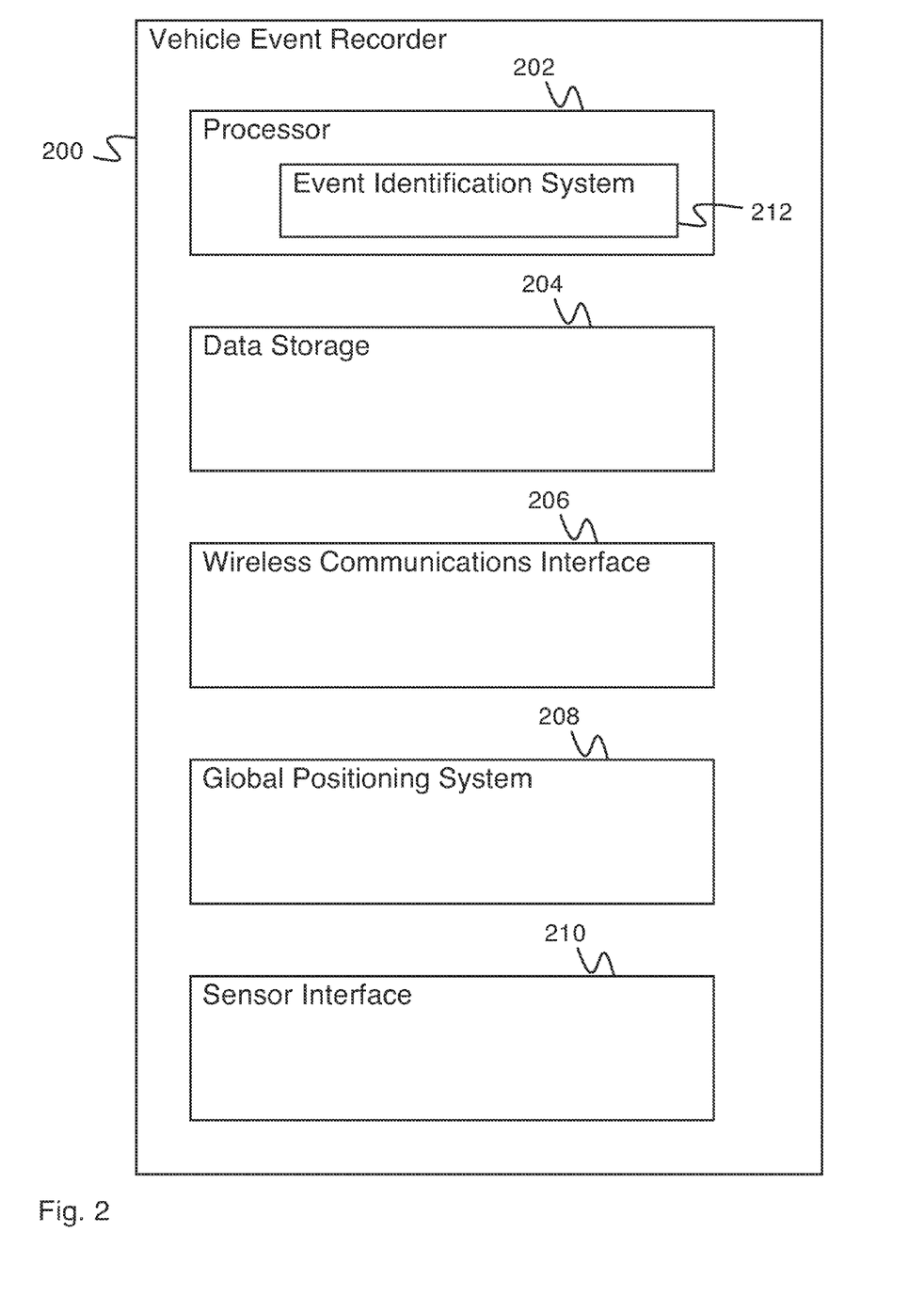
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a global system for mobile communications (GSM) interface, a code division multiple access (CDMA) interface, a WiFi interface, universal mobile telecommunications system (UMTS), long term evolution (LTE), worldwide interoperability for microwave access (WiMax), integrated digital enhanced network (iDEN), or any other appropriate interface. Global positioning system 208 comprises a global positioning system (e.g., GPS, Wi-Fi location, TV transmission, etc.) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via an OBD bus (e.g., society of automotive engineers (SAE) J1939, J1708/J1587, OBD-II, CAN BUS, etc.).

In the example shown, processor 202 comprises event identification system 212. Event identification system 212 comprises a system for examining sensor data and determining an event type. In various embodiments, event types include accidents, probable collisions, speed limit violations, rough road events, hard maneuvering events (e.g., hard cornering, hard braking), dangerous driving events (e.g., cell phone usage, eating while driving, working too long of a shift, sleepy driving, etc.), or any other appropriate event types. In some embodiments, event identification system 212 determines the probability the event is associated with each of the event types and selects the one event type with the highest probability as the event type associated with the event. In some embodiments, business rules and risk assessment techniques vary based on the event type. For example, speeding may be riskier in inclement weather than clement weather. Additionally, it may be desired to upload events that are a combination of risky behavior types (e.g., a speed & following too close as opposed to 2 speed events). Other examples of risky combination events include: hard maneuvering in dense traffic (e.g., an event identified by the system and information from the server—for example, where the hard maneuver is detected by the event identification system and the traffic information is available on the server from a third party traffic information database); hard maneuvering at elevated speeds (e.g., an event identified by the system and information from the server—for example, where the event identification system in the vehicle identifies the hard maneuver and the excessive speed state based on the road type and/or posted speed from a map database or other database); driving slower or faster than the speed of traffic (e.g., an event identified by the system and information from the server—for example, the event identification system may capture events when the vehicle is traveling slower than the posted speed, and the server, which has data about the traffic at the time of the event, can determine whether the vehicle is traveling slow or fast relative to the traffic speed and assess the probability that this condition is risky); driving over rough or uneven road segments at an unsafe speed (e.g., an event identified by the system and information from the server—for example, the event identification system detects elevated forces when the vehicle hits a patch of rough road, and stores an event; the server evaluates whether the vehicle was traveling at an excessive speed relative to traffic, road, and/or weather conditions); driving too fast or too slow towards the end of a long shift (e.g., an event identified by the system and information from the server—for example, an event showing out of range speed on a road plus server information relating to the driver such as the time the driver has been on shift or the start and stop times of a shift); or any other combination of factors that is associated with an increased probability of driving risk. In some embodiments, business rules and risk assessment techniques are based on a combination of two or more event types. In some embodiments, business rules and risk assessment techniques are based on a combination of an event type and server information. In some embodiments, server information comprises information in a database (e.g., a map database, a speed database, a traffic information database, a weather database, a road condition database, driver information databases, etc.), information from a third party source, or any other appropriate information.

Figure 3:
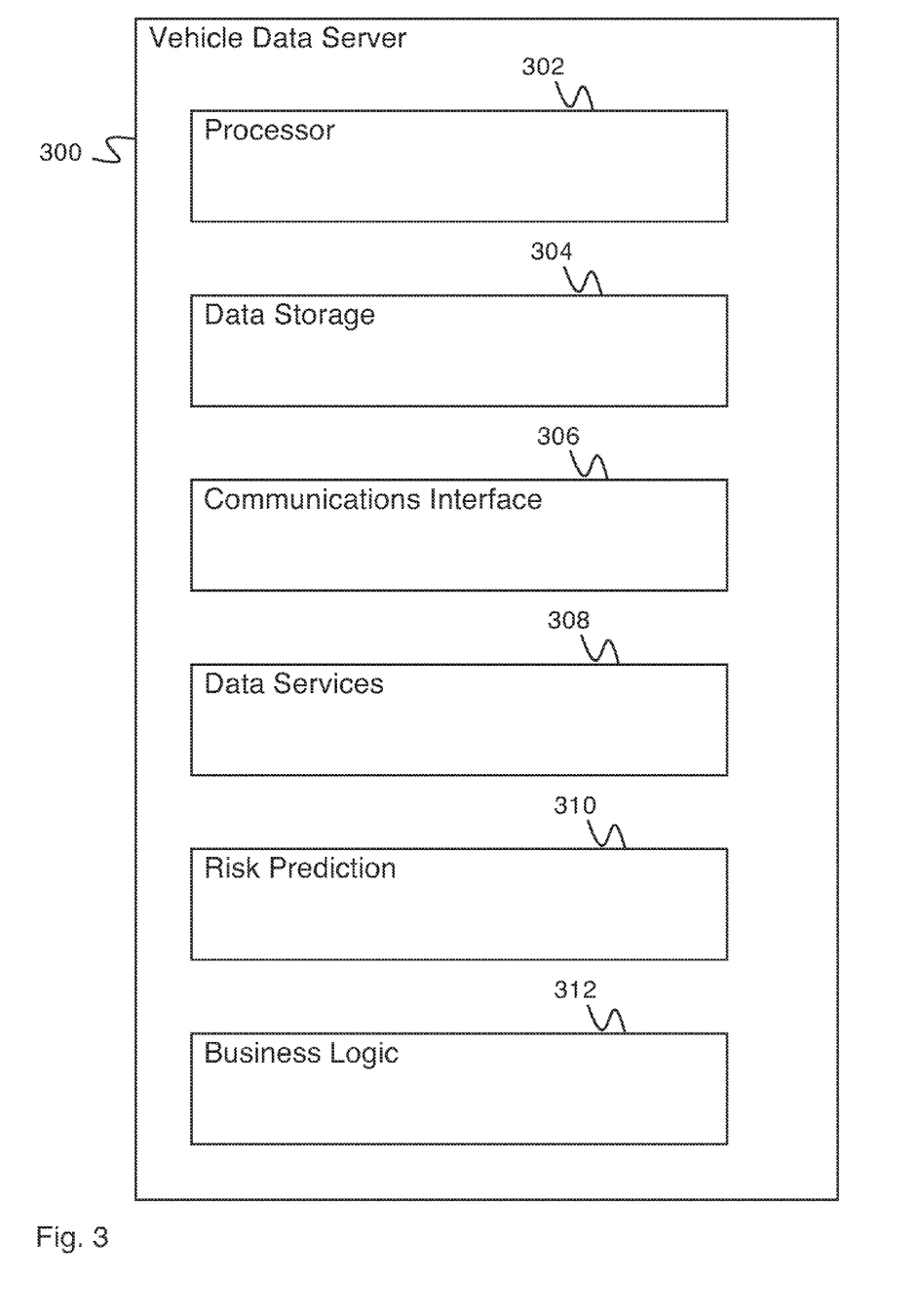
FIG. 3 is a block diagram illustrating an embodiment of a vehicle data server.

FIG. 3 is a block diagram illustrating an embodiment of a vehicle data server. In some embodiments, vehicle data server 300 of FIG. 3 comprises vehicle data server 104 of FIG. 1. In the example shown, vehicle data server 300 comprises processor 302. Processor 302 comprises a processor for controlling the operations of vehicle data server 300, for reading and writing information on data storage 304, for communicating via communications interface 306 (e.g., a wireless or wired communication interface), for acquiring data using data services 308, for determining risk associated with an event using risk prediction 310, and for enforcing business logic 312, where business logic includes logic to enforce business rules—for example, one or more of the following: a time of day restriction, a data cost restriction, a privacy restriction (e.g., based on a consent of a driver, an employer, a supervisor, etc.), a subscription restriction or privilege (e.g., based on up to date paid account, data transfer only when cost of transfer is low, transfer immediately, etc.), a service contract restriction or privilege (e.g., data transfer only for a subset of drivers, only transfer for highest risk drivers, etc.), or any appropriate business rule. Data storage 304 comprises a data storage (e.g., a RAM—e.g., random access memory, a ROM—e.g., read only memory, a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, vehicle event review data, or any other appropriate data. In various embodiments, communications interface 306 comprises one or more of an Ethernet interface, a GSM interface, a CDMA interface, a WiFi interface, or any other appropriate interface. Data services 308 comprises interfaces to one or more data services for retrieving data. In various embodiments, the one or more data services comprise weather report services, traffic report services, speed limit services, driver shift data services, vehicle data server historical data services, or any other appropriate data services. In various embodiments, weather and/or traffic data is current data, real-time data, historic data, averaged data, or any other appropriate weather or traffic information. Risk prediction 310 comprises one or more algorithms for determining the risk associated with an event. In some embodiments, risk prediction 310 comprises algorithms for determining the risk associated with an event from the associated event data. In some embodiments, risk prediction 310 comprises algorithms for determining the risk associated with an event from a subset of the associated event data. In various embodiments, risk prediction 310 comprises algorithms for determining risk associated with an event using data acquired from data services 308—for example, weather conditions (e.g., sunny, cloudy, rainy, foggy, snowy, etc.), traffic conditions (e.g., current speed of travel, accidents in proximity, construction information, etc.), transient regulations (e.g., time of day speed limits, variable speed limits, high occupancy vehicle lane requirements, etc.), driver information (e.g., hours of service details, 14 day driving history, etc.), vehicle information (e.g., vehicle speed limits, hazardous material restrictions, other vehicle related restrictions, etc.), or any other appropriate data for risk prediction. Business logic 312 comprises one or more algorithms for determining a number of events that can be retrieved from a vehicle event recorder based on business considerations—e.g., cost, subscription type, service contract, privacy opt-in etc.

Figure 4:
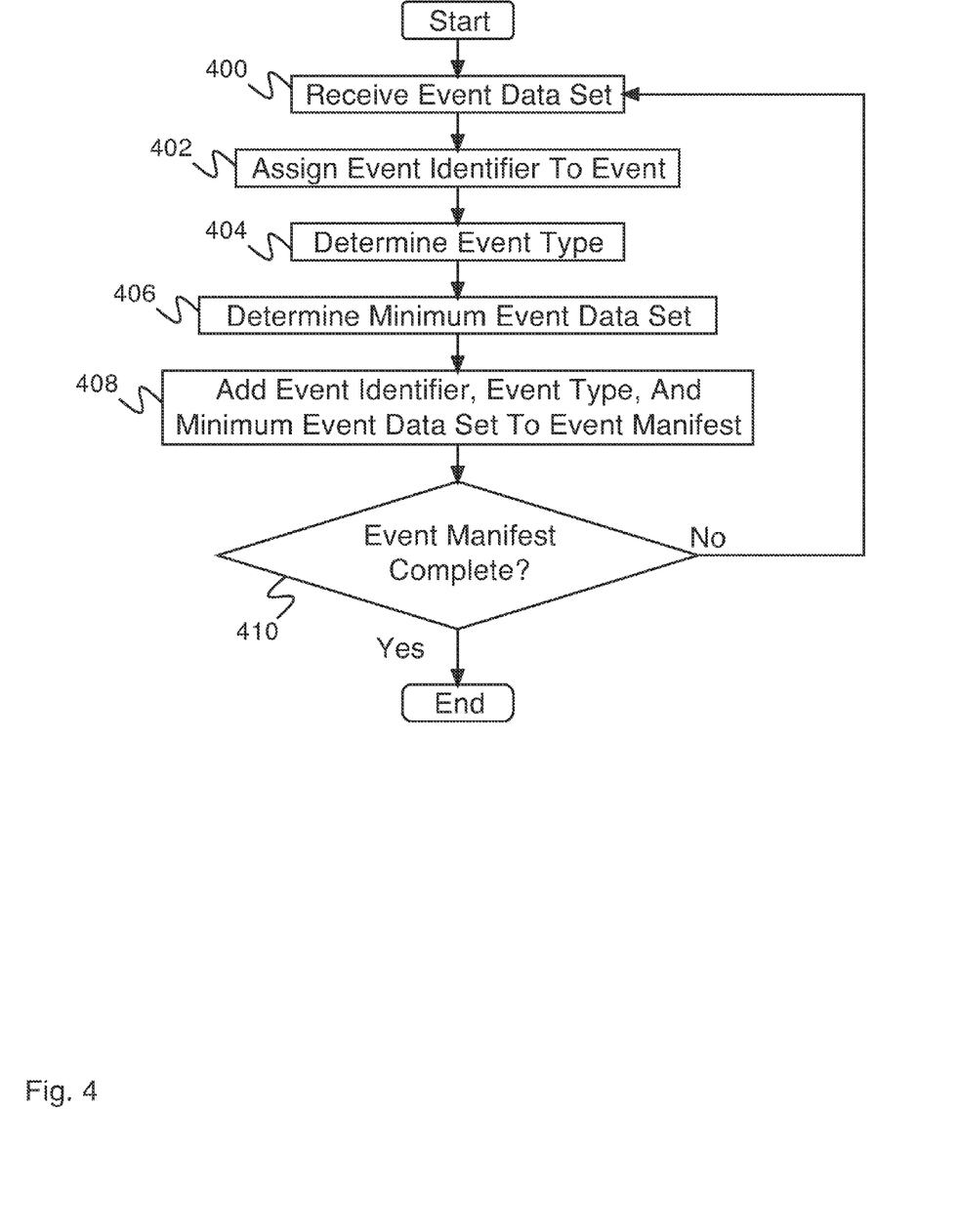
FIG. 4 is a flow diagram illustrating an embodiment of a process for building an event manifest.

FIG. 4 is a flow diagram illustrating an embodiment of a process for building an event manifest. In some embodiments, the process of FIG. 4 is executed by processor 202 of FIG. 2. In some embodiments, an event manifest comprises a summary of events and associated event data for use by a vehicle data server for determining a set of events to request. In some embodiments, an event manifest comprises a set of sets of an event identifier, an event type, and a minimum event data set. In the example shown, in 400, an event data set is received, e.g., via a sensor interface. In 402, an event identifier is assigned to the event. In various embodiments, an event identifier is determined sequentially, randomly, by derivation from the event data, or in any other appropriate way. In 404, an event type is determined. In various embodiments, an event type comprises one of the following: an accident event, a possible collision event, a speed limit violation event, a rough road event, a hard cornering event, a hard braking event, a dangerous driving event (e.g., cell phone usage, eating while driving, working too long of a shift, sleepy driving, etc.), or any other appropriate event type. In 406, a minimum event data set is determined. In some embodiments, a minimum event data set comprises a subset of the event data set received in 400. In some embodiments, a minimum event data set comprises the minimum amount of event data necessary to determine if the event should be requested by the vehicle data server. In some embodiments, a minimum event data set for a speeding event comprises a data set that includes a device serial number, a system trigger timestamp, a GPS trigger timestamp, a vehicle profile ID (e.g. an encoding of the type of vehicle such as a light duty pickup truck or a heavy tractor/trailer), a latitude, a longitude, a heading, a road segment map ID (e.g., a mapping road segment identification for road details), a speed limit, a maximum speed, and an average speed. In some embodiments, a minimum event data set for a hard cornering event comprises a data set that includes a device serial number, a system trigger timestamp, a GPS trigger timestamp, a vehicle profile ID, a forward acceleration threshold, a lateral acceleration threshold, an event identification algorithm version, an event identification algorithm decision node (e.g. a decision node from a decision tree model), an average vehicle speed, a maximum vehicle speed, a recent vehicle speed history, average and extreme (i.e., maximum acceleration magnitude with the sign of the acceleration when the maximum value is measured) forward acceleration, average and extreme lateral acceleration, average and extreme vertical acceleration, probability accelerating (e.g., the estimated probability according to a neural network algorithm that the vehicle was accelerating at the time the event was triggered), probability braking (e.g., the estimated probability according to a neural network algorithm that the vehicle was braking—i.e., decelerating—at the time the event was triggered), probability collision (e.g., the estimated probability according to a neural network algorithm that the vehicle was involved in a collision at the time the event was triggered), probability left cornering (e.g., the estimated probability according to a neural network algorithm that the vehicle was cornering to the left at the time the event was triggered), probability right cornering (e.g., the estimated probability according to a neural network algorithm that the vehicle was cornering to the right at the time the event was triggered), probability rough road (e.g., the estimated probability according to a neural network algorithm that the vehicle was driving over a rough/uneven surface at the time the event was triggered).

In various embodiments, the event data set comprises one or more of the following: a device serial number, a system trigger timestamp, a GPS trigger timestamp, a vehicle profile ID, a forward acceleration threshold, a lateral acceleration threshold, an event identification algorithm version, an event identification algorithm decision node (e.g. a decision node from a decision tree model), an average vehicle speed, a maximum vehicle speed, a recent vehicle speed history, average and extreme (i.e., maximum acceleration magnitude with the sign of the acceleration when the maximum value is measured) forward acceleration, average and extreme lateral acceleration, average and extreme vertical acceleration, probability accelerating (e.g., the estimated probability according to a neural network algorithm that the vehicle was accelerating at the time the event was triggered), probability braking (e.g., the estimated probability according to a neural network algorithm that the vehicle was braking—i.e., decelerating—at the time the event was triggered), probability collision (e.g., the estimated probability according to a neural network algorithm that the vehicle was involved in a collision at the time the event was triggered), probability left cornering (e.g., the estimated probability according to a neural network algorithm that the vehicle was cornering to the left at the time the event was triggered), probability right cornering (e.g., the estimated probability according to a neural network algorithm that the vehicle was cornering to the right at the time the event was triggered), probability rough road (e.g., the estimated probability according to a neural network algorithm that the vehicle was driving over a rough/uneven surface at the time the event was triggered), latitude, longitude, heading, road segment map ID, telemetry trail, speed limit, road class, associated event ID, prior event ID (e.g., a Globally Unique ID), subsequent event ID, research flag (e.g. indicating whether or not the event was identified for research purposes only), or any other appropriate data.

In 408, the event identifier, event type, and minimum event data set are added to the event manifest. In 410, it is determined whether the event manifest is complete. In various embodiments, the event manifest is determined to be complete after a predetermined number of events have been added, after a predetermined amount of time has passed since the first event was added, after a predetermined number of miles have been driven since the first event was added, or in any other appropriate way. In the event the event manifest is not determined to be complete, control passes to 400. In the event the event manifest is determined to be complete, the process ends. In some embodiments, once the event manifest is determined to be complete (e.g., once the event manifest is built), the event manifest is transmitted to the vehicle data server. In some embodiments, the event manifest is transmitted to the vehicle data server automatically if the vehicle event recorder is rebooted (e.g., regardless of whether the condition of 410 has been satisfied). In some embodiments the event manifest is transmitted to the vehicle data server automatically in case of emergency.

In some embodiments, a user initiates a check in. There is a button on the vehicle event recorder. Quickly pushing and releasing the button causes the camera to capture a video. This can be used if the driver is cutoff or any reason they want to capture a video. If the button is held for approximately 5 seconds or longer, this will initiate a check-in as opposed to capturing a video. This is used in the case of an accident or other condition where the driver is instructed to force the camera to check-in and deliver the manifest to the backend for transfer decision.

Figure 5A:
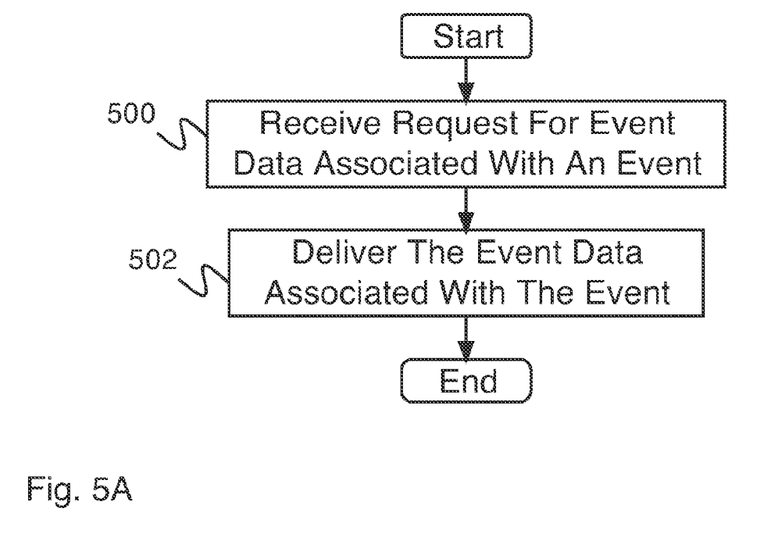
FIG. 5A is a flow diagram illustrating an embodiment of a process for delivering event data associated with an event.

FIG. 5A is a flow diagram illustrating an embodiment of a process for delivering event data associated with an event. In some embodiments, the process of FIG. 5A is executed by processor 202 of FIG. 2. In the example shown, in 500, a request for event data associated with an event is received. In some embodiments, the request is received from a vehicle data server. In some embodiments, the request identifies an event by an event identifier. In some embodiments, the request identifies an event or set of events by a time window (e.g., start and stop date/time). In 502, the event data associated with the event is delivered. In some embodiments, the event data is delivered via a wireless connection. In some embodiments, delivering the event data is delayed until a time when a wireless connection is available for a reduced cost. In some embodiments, the process of FIG. 5A is used for delivering event data associated with a set of events.

Figure 5B:
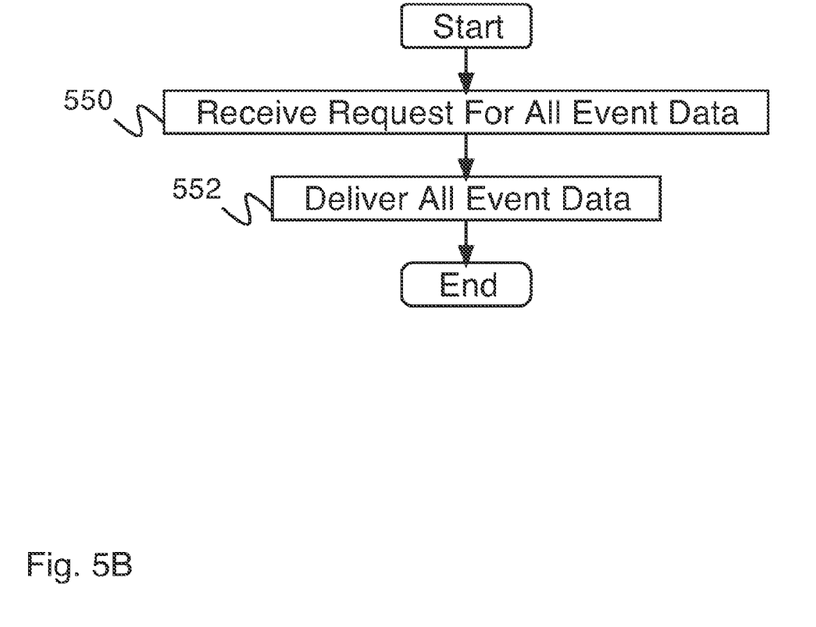
FIG. 5B is a flow diagram illustrating an embodiment of a process for delivering all event data.

FIG. 5B is a flow diagram illustrating an embodiment of a process for delivering all event data. In some embodiments, the process of FIG. 5B is executed by processor 202 of FIG. 2. In the example shown, in 550, a request for all event data is received. In some embodiments, the request is received from a vehicle data server. In some embodiments, a request for all event data is only issued when a low-cost and high-bandwidth connection (e.g., a wired connection) is available. In 552, all event data is delivered.

Figure 6:
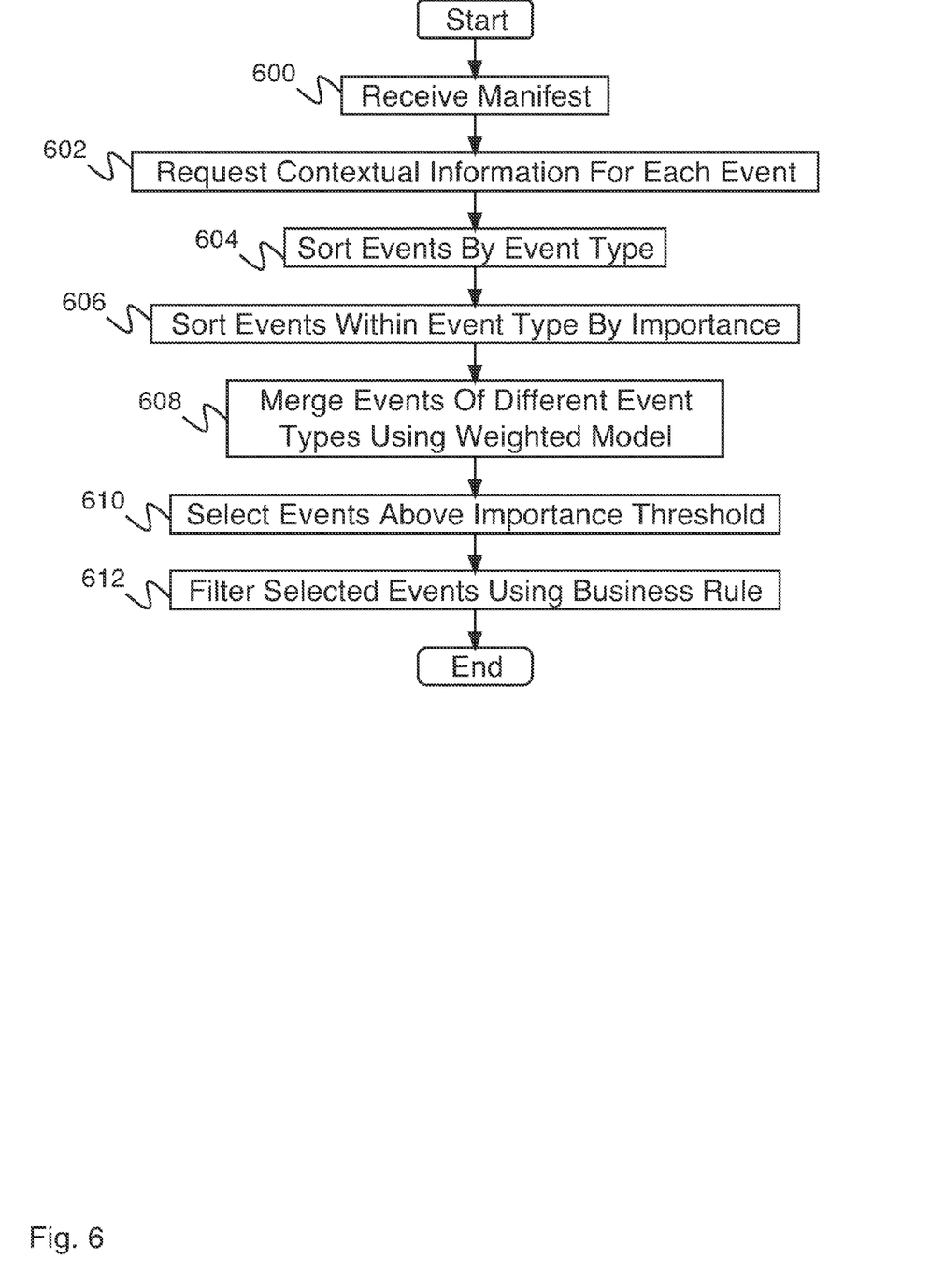

FIG. 6 is a flow diagram illustrating an embodiment of a process for determining events to request associated event data for. In some embodiments, the process of FIG. 6 is executed by processor 302 of FIG. 3. In 600, a manifest is received. In some embodiments, a manifest is received from a vehicle event recorder. In some embodiments, a manifest comprises a set of events, each event including an event ID, an event type, and a set of associated data. In some embodiments, one or more manifests are received in 600 over the course of a day, and control proceeds to 602 (e.g., it is determined whether to upload additional information about each event of the one or more manifests) at night.

In 602, contextual information is requested for each event. In some embodiments, contextual information is requested for each event by a data services (e.g., data services 308 of FIG. 3). In various embodiments, contextual information comprises one or more of the following: weather conditions, traffic conditions, posted regulations, timing within driver shift, vehicle data server historical information, behavior outcome of past reviewed events, or any other appropriate information. In various embodiments, vehicle data server historical information comprises one or more of the following: company historical information, group historical information, vehicle historical information, or driver historical information. In 604, the events are sorted by event type. In 606, the events are sorted within event type by importance. For example, speed limit violation events can be ranked by importance by calculating the over speed as a percentage of the posted speed and sorting the events from high to low using those percentages. As another example, rough road and hard maneuvering events can be ranked based on the expected likelihood that the event contains behaviors associated with collision risk using historical information of behaviors observed in that driver, vehicle, group and/or company as a proxy. In various embodiments, event importance comprises likelihood for event data to show a risky event, likelihood for event data to show a coachable event, has a probability of collision greater than a collision probability threshold, or a probability of contributing to a collision greater than a contributing to a collision probability threshold, or event importance comprises any other appropriate event importance criteria. In some embodiments, event importance is based at least in part on associated event data. In some embodiments, event importance is based at least in part on event contextual information. In some embodiments, some event types are considered unimportant and determining event importance comprises determining if other event criteria are also satisfied (e.g., if there was another event type occurring simultaneously). Events have a priority ranking so a speeding event is lower priority than a hard maneuver event. In the case of simultaneous events (e.g., occurring within the same recording interval), the higher priority event is selected. The prioritization is based upon the probability of contributing to a collision or the probability of a collision. In some embodiments, additional information is only uploaded for speed limit violation events if other event criteria are also satisfied. In 608, events of different event types are merged using a weighted model. In some embodiments, merging events of different types using a weighted model comprises multiplying the importance value of each event of each type by a weighting factor, wherein the weighting factors are constant within an event type but can vary between event types, and then sorting the events by weighted importance. In some embodiments, the relative importance weight of different event types, like hard maneuvers, lane departure, speed limit violations, etc., can be modeled using the effectiveness with which that event type has put in evidence behaviors associated with collision risk during the last D number days or E number of events. In some embodiments, some event types have low weights in order to reduce the likelihood that they will be uploaded. In 610, events above an importance threshold are selected. Any number of events above the importance threshold may be selected. In some embodiments, one or more events not above the importance threshold (e.g., for which it was determined not to upload additional information) are randomly selected for upload. In some embodiments, the importance threshold depends in part on the wireless connection type available (e.g., if only an expensive wireless connection type is available, a higher importance threshold is used such that fewer events are selected for upload). In some embodiments, the importance threshold depends in part on the availability of a low cost wireless connection. In some embodiments, fewer events are determined to be uploaded in the event that only a cellular connection is available. In 612, the selected events are filtered using a business rule. In various embodiments, a business rule comprises a maximum number of events uploaded per hour, maximum number of events uploaded per day, maximum number of events uploaded during daytime hours, maximum number of events below a given importance threshold uploaded per day, or any other appropriate business rule. In various embodiments, a business rule comprises a target transfer rate per vehicle event recorder per time interval, a target transfer rate per company per time interval, a target transfer rate per vehicle event recorder per time interval and event type, a target minimum number of events per vehicle event recorder per time interval and event type, or any other appropriate business rule. In some embodiments, a business rule applies only to video data transfer. In various embodiments a business rule comprises a maximum number of videos transferred per vehicle event recorder per time interval, an authorization/deauthorization to transfer videos by event type, an authorization/deauthorization to transfer videos by time and other criteria (e.g., videos may be transferred at any time, videos may be transferred off peak only, videos may be transferred at off peak only unless there is a high probability that the video contains a collision, the decision to transfer video may be based on the reason for transmitting the manifest—e.g., a regular manifest check-in vs. a check-in on vehicle event recorder reboot or forced check-in, the decision to transfer video may be based on the reason for transmitting the manifest and the probability that the video contains a collision, etc.), or any other appropriate business rule. In various embodiments, a business rule comprises a static privacy-based rule (e.g., transmit external video data but not interior video data), a dynamic privacy-based rule (e.g., transmit exterior video only for a predetermined fraction of the best drivers and exterior and interior video for the remaining drivers), a geographic privacy-based rule (e.g., transmit exterior video only if the vehicle is in certain regions and transmit exterior and interior video if the vehicle is in other regions), or any other appropriate business rule.

In some embodiments, the following example is a narrative with speed events. The vehicle event recorder saves triggered events which include posted speed violations. The manifest of events is delivered to the vehicle data server. The vehicle data server receives event data as delivered in the manifest plus the contextual information regarding the most current posted speed information. This corrects for newer map data plus allows for the application of time of day rules, trucking specific speeds (e.g., different speed limits for large trucks), or other contextual adjustments. Additional contextual information may include the current posted speed transfer statistics. Based on this data, the speed events are prioritized into the risk ranking including ordering based on percent over the speed limit. Once the events are ranked, the previous statistical data on posted speed transfer rate is applied to determine which posted speed events are to be transferred from the vehicle event recorder to the vehicle data server. A business rule can be applied to ensure that if two events are very similar (e.g., speeding on the same road during a short time) only one of them is transferred.

In some embodiments, the number of events to request additional information for is based at least in part on a cost criterion (e.g., a business rule). In some embodiments, the frequency of events to request additional information for is based at least in part on a cost criterion (e.g., a business rule). In some embodiments, after events are selected and filtered, additional information (e.g., event data) associated with each remaining event is requested. In some embodiments, the additional information is received. In some embodiments, the additional information is received at a time determined to reduce the cost of data transmission. In some embodiments, a vehicle event recorder checks-in and delivers the manifest after each event. Then, at the nightly off-peak check-in, the vehicle data server requests the additional data for the selected events. This allows for knowledge of the events but controls the cost of additional data delivery.

Figure 7:
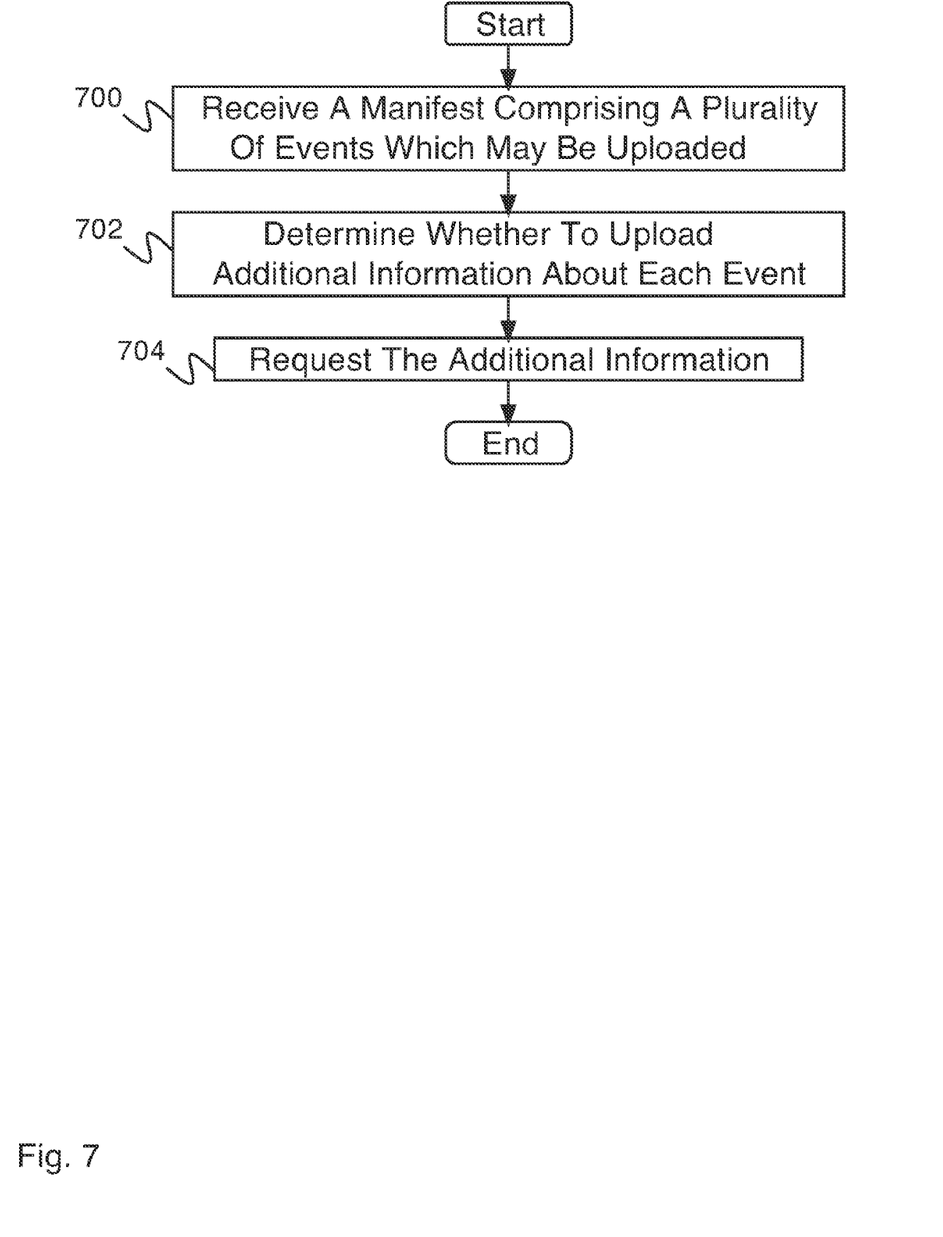
FIG. 7 is a flow diagram illustrating an embodiment of a process for uploading data.

FIG. 7 is a flow diagram illustrating an embodiment of a process for uploading data. In some embodiments, the process of FIG. 7 is executed by vehicle data server 104 of FIG. 1. In the example shown, in 700, a manifest comprising a plurality of events which may be uploaded is received. In some embodiments, the manifest additionally comprises sensor information relating to each of the plurality of events. In 702, it is determined whether to upload additional information about each event. In some embodiments, determining whether to upload additional information about each event is based at least in part on the sensor information and contextual information. In 704, the additional information is requested.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for requesting data, comprising:
an input interface configured to:
receive a manifest comprising sensor information associated with a plurality of events; and
a processor configured to:
sort the plurality of events by event importance, wherein the event importance is based at least in part on the subset of the sensor information and contextual information relating to the plurality of events;
select at least one event from the plurality of events according to an event importance associated with the at least one event; and
an output interface configured to:
request additional information for the selected at least one event.

2. The system of claim 1, wherein the processor is additionally configured to determine the contextual information relating to the plurality of events.

3. The system of claim 2, wherein the contextual information relating to the selected at least one event comprises one or more of the following: weather conditions, location, traffic conditions, posted regulations, timing within driver shift, or a behavior outcome of past reviewed events.

4. The system of claim 1, wherein events are selected for uploading for a combination of risky behavior types.

5. The system of claim 1, wherein a number of events selected is based at least in part on a cost criterion.

6. The system of claim 1, wherein a frequency of events selected is based at least in part on a cost criterion.

7. The system of claim 1, wherein selecting the at least one event includes randomly selecting the at least one event from events having an associated event importance above a threshold.

8. The system of claim 1, wherein the sorting the plurality of events is further based at least in part on one or more of the following factors: the likelihood that the event is coachable, has a probability of collision greater than a collision probability threshold, and a probability of contributing to a collision greater than a contributing to a collision probability threshold.

9. The system of claim 1, wherein selecting the at least one event includes randomly selecting the at least one event from events having an associated importance above a threshold, wherein the threshold is based at least in part on the wireless connection type available.

10. The system of claim 9, wherein the threshold increases with an increasing cost of a wireless connection.

11. The system of claim 9, wherein the threshold is set such that fewer events are selected to be uploaded if only a cellular connection is available compared with other types of connections being available.

12. The system of claim 1, wherein the input interface is configured to receive the additional information.

13. The system of claim 12, wherein the additional information is received at a time determined to reduce a cost of data transmission.

14. The system of claim 1, wherein:
the manifest is received during a first period of time; and
the selecting the at least one event is performed during a second period of time, the second period of time being at least partially non-overlapping with the first period of time.

15. The system of claim 1, wherein the selecting the at least one event is based at least in part on a business rule.

16. The system of claim 1, wherein the processor is further configured to filter the selected at least one event according to a business rule, wherein the business rule enforces one or more of the following: a time of day restriction, a data cost restriction, a privacy restriction, service contract restriction or privilege, or a subscription restriction or privilege.

17. The system of claim 1, wherein the event importance is based on a likelihood that the subset of the sensor information and the contextual information indicates a risky driving event.

18. The system of claim 1, wherein the additional information includes captured sensor information other than the subset of sensor information of the manifest.

19. The system of claim 1, further comprising:
a vehicle event recorder coupled to a vehicle configured to:
capture sensor information relating to the plurality of events, wherein the sensor information comprises data from a plurality of sensors;
store the sensor information relating to the plurality of events; and
send the manifest of the plurality of events to the input interface.

20. A method for uploading data, comprising:
receiving a manifest comprising sensor information associated with a plurality of events;

sort the plurality of events by event importance, wherein the event importance is based at least in part on the subset of the sensor information and contextual information relating to the plurality of events;

select at least one event from the plurality of events according to an event importance associated with the at least one event; and requesting additional information for the selected at least one event.

21. A computer program product for uploading data, the computer program product being embodied in a non-transitory tangible computer readable storage medium and comprising computer instructions for:

receiving a manifest comprising sensor information associated with a plurality of events;

sort the plurality of events by event importance, wherein the event importance is based at least in part on the subset of the sensor information and contextual information relating to the plurality of events;

select at least one event from the plurality of events according to an event importance associated with the at least one event; and requesting additional information for the selected at least one event.

\* \* \* \* \*